Sept. 19, 1967 — R. G. LEE — 3,342,341
FILTER FOR A SELF-CONTAINED SEWAGE SYSTEM
Filed Aug. 12, 1965
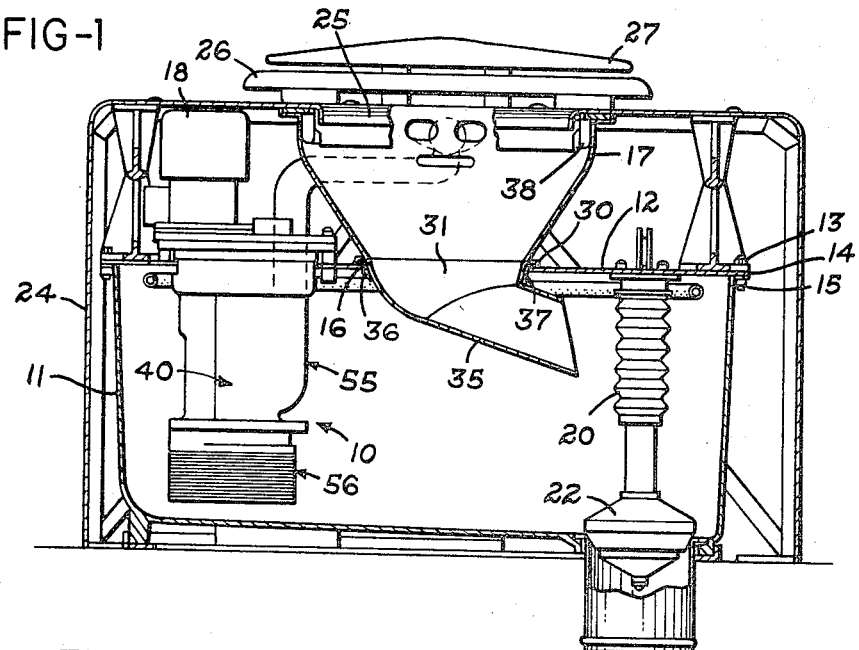
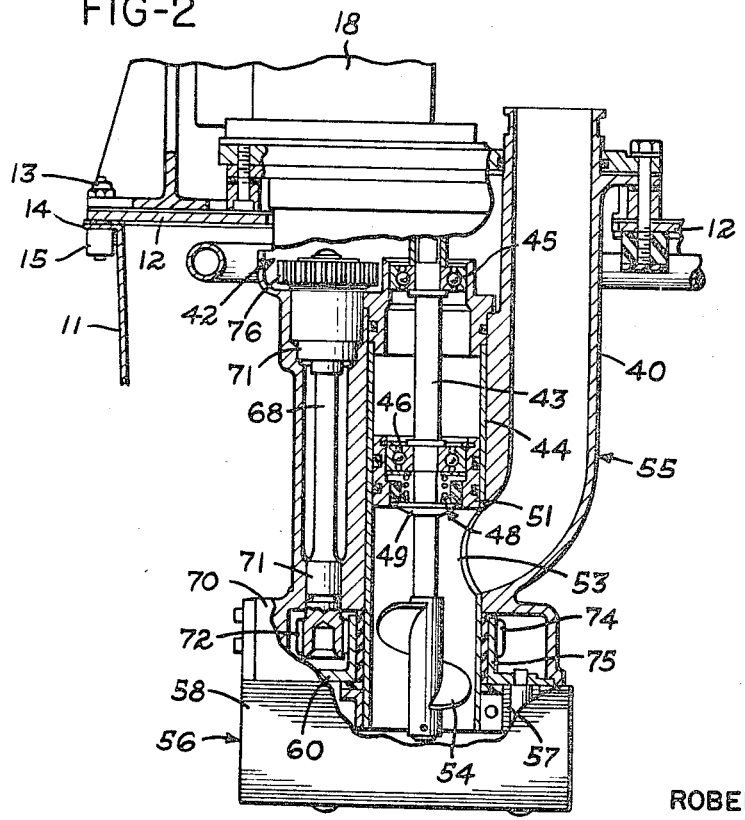
INVENTOR.
ROBERT G. LEE

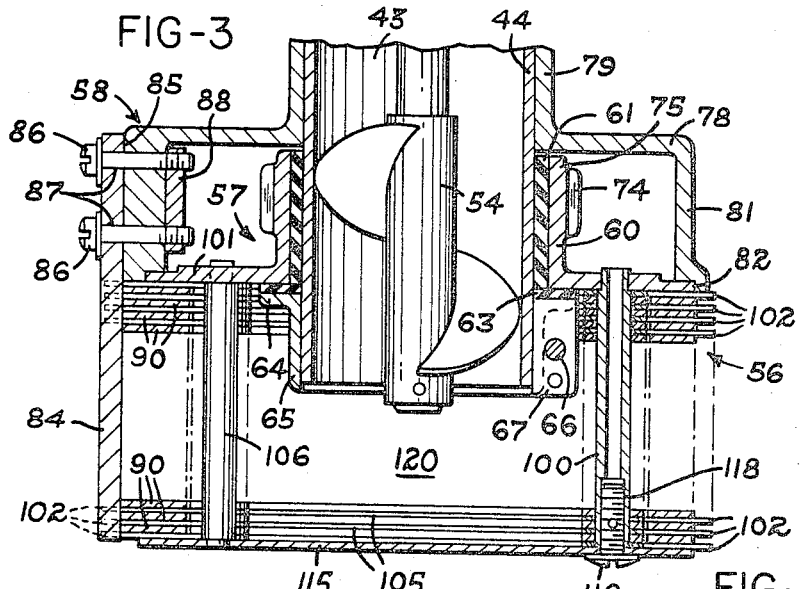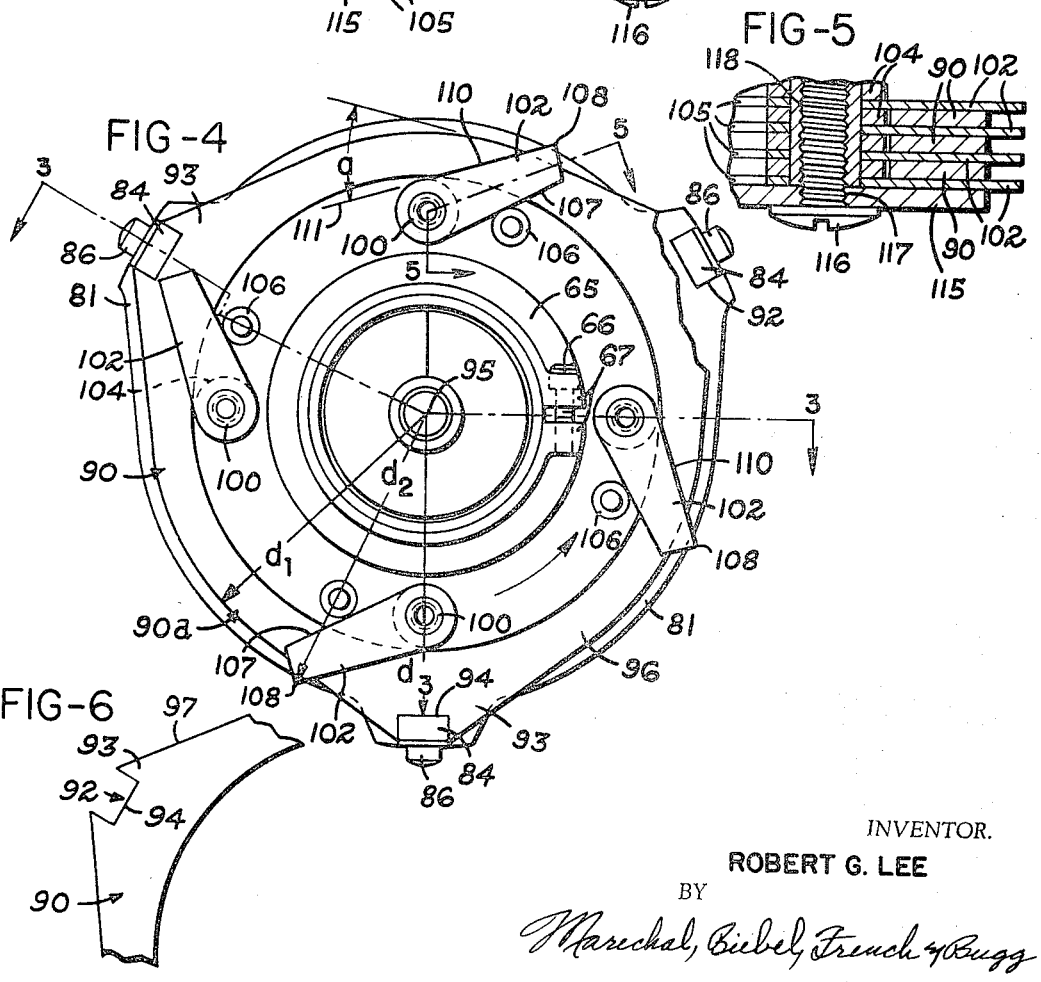

United States Patent Office 3,342,341
Patented Sept. 19, 1967

3,342,341
FILTER FOR A SELF-CONTAINED
SEWAGE SYSTEM
Robert G. Lee, Dayton, Ohio, assignor to Koehler-Dayton, Inc., Dayton, Ohio, a corporation of Ohio
Filed Aug. 12, 1965, Ser. No. 479,093
1 Claim. (Cl. 210—357)

ABSTRACT OF THE DISCLOSURE

A filter for use in a self-cleaning sewerage system to prohibit the passage of paper and particles through the system. The filter includes a plurality of stacked annular rings which have cleaning blades mounted therebetween to move between the blades and force any particles which might collect between the blades or on the outside of the filter toward the spaced supporting bars of the filter.

---

This invention is especially related to filtering devices, and particularly to filtering devices adapted for use with sewerage systems or the like.

The use of sewerage systems in various commercial and business transportation vehicles, such as planes and busses, has come into wide acceptance, and these systems are generally self-contained and include a flush bowl mounted on a tank containing chemical-water solution for flushing and deodorization. To flush the contents of the bowl into the tank, a power operated pump is energized to force the solution from the tank through a manifold surrounding the upper portion of the flush bowl and along the side walls of the flush bowl to wash the contents thereof into the tank. One such system is shown and described in the United States Patent to Dietz et al., No. 3,067,433, issued December 11, 1962, and assigned to the assignee of this application.

The flushing solution must be filtered during such flushing cycle to remove the solid particles therefrom so that the pump and manifold will not be clogged. These filters must be non-clogging and capable of accomplishing the desired filtering operation while consuming a minimum of space. One difficulty which is frequently encountered is that the paper, and plastic material used in baby diapers, and the like, is caught between the filtering plates and then wound around the exterior of the filter causing the entire filter to be blocked so that no fluid flows during the flushing operation. Furthermore, as the various solids build up on the exterior of the filter they gradually clog the filter causing reduced rate of liquid flow during the flushing cycle.

Accordingly, an important object of this invention is to provide an improved filter device which is free of the aforesaid disadvantages and which is self-cleaning and provides maximum filtration for fluid flow at a high volumetric rate.

Another object of this invention is to provide a filter of the aforesaid type which is adapted particularly for use in self-contained sewerage systems, and further to provide such a filtering device wherein the exterior thereof which contacts the liquid to be filtered is stationary thus prohibiting the winding of material around the exterior of the filter.

A further object of this invention is to provide an improved filter structure of the aforesaid type wherein the spaces between parallel filtering plates are cleaned from the inside out in such a manner that no solids can be trapped between the filtering plates and so that the solids which are removed from between the plates build up at points on the exterior of the filter and eventually fall off, and particularly to provide a filter structure which is simple in design and operation for maximum dependability over long periods of use.

Other objects and advantages of the invention will be apparent from the following description, the accompanying drawings and the appended claims.

In the drawings:

FIG. 1 is a vertical sectional view through a sewerage system embodying the invention;

FIG. 2 is an elevation, partially in section, of the filtering device of the invention;

FIG. 3 is an enlarged sectional view taken along the line 3—3 of FIG. 4;

FIG. 4 is a bottom view of the filter shown in FIG. 3 with the bottom plate thereof removed;

FIG. 5 is an enlarged sectional view showing the interleaved cleaning knives and filtering plates; and FIG. 6 is a fragmentary view of one of the filtering plates.

Referring to the drawings, which illustrate a preferred embodiment of the invention, FIG. 1 illustrates the filter-pump assembly 10 in accordance with the invention. This assembly is shown and described in connection with a self-contained sewerage system of the type disclosed in the aforesaid Dietz et al. patent since it is particularly suited for use in such sewerage systems. Thus the sewerage system includes a tank 11 with its open top normally closed by cover 12, the latter being secured in position by a number of conventional bolt fasteners 13 which extend through peripheral openings in the cover 12 and flanges 14 of tank 11 into threaded engagement with nuts 15.

The cover 12 has a centrally located aperture 16 therein and is designed to support substantially all of the operating components of the system so that they may easily be removed for maintenance purposes. Thus, the flush bowl 17, the pump-filter assembly 10, the drive motor 18, the drainage actuator tube 20 and its valve head 22 are secured in one manner or another to the cover 12. A casing or housing 24 is mounted on and secured to the tank 11 and the upper portion of the flush bowl 17, thereby enclosing all of the operating components of the system. An opening 25 in the casing 24 is positioned immediately above the bowl 17, and the seat 26 and its cover 27 as shown in FIG. 1 are pivotally mounted thereabove on the casing 24 to form a complete enclosure.

The flush bowl 17 has an annular flange 30 secured around the lower periphery of discharge outlet 31, preferably by brazing, although any expedient which will securely interconnect the bowl 17 and flange 30 and prevent the passage of fluids therebetween, will be satisfactory. A portion of the flange 30 extends horizontally therefrom to engage the cover 12 around the periphery of aperture 16 to support the flush bowl 17 on the cover 12.

A spout 35 is pivotally connected to the flange 30 by a suitable hinge 36 which is secured thereto to permit movement of the spout 35 to a normal position, as shown by the solid lines of FIG. 1, wherein waste material in the bowl 17 is flushed therefrom through the spout 35 and into the tank 11 at a point spaced laterally from directly below the discharge outlet 31. In this normal position the contents of the tank 11 are not visible through the flush bowl 17 and the liquid in the tank will not be splashed into the bowl. On the other hand, when power fails or the motor 18 is inoperative, the spout 35 can be manually pivoted to an inactive position wherein waste material can drop directly from the bowl 16 into the tank 11 without flushing it through the spout. To hold the spout 35 releasably in its normal position, the flexible pressure clasps 37 are secured to the spout at spaced intervals around the upper periphery thereof which release the spout when downward pressure is applied thereto. Reference is made to the U.S. patent of Herkenhine et al. No.

3,172,131 granted Mar. 9, 1965, and assigned to the assignee of this invention.

In the operation of the system, the filter-pump assemble 10 draws fluid from tank 11 and pumps it into the manifold 38 around the upper periphery of bowl 17, from which it flows through a plurality of openings in the manifold along the inside of the bowl 17 in a swirling manner to wash the contents of the bowl 17 through the spout 35 and into the tank 11.

The pump-filter assembly 10 includes a housing 40 which is secured to the cover 12 of the tank 11 in such a manner that this assembly 10 is removable with the cover 12 from the tank 11. The housing 40 has an electric motor 18 mounted on the top surface thereof for driving the gear reduction unit 42 which has a first output in the form of the elongated drive shaft 43 rotatably mounted in the downwardly extending support tube 44. The sealed lubricated ball bearings 45 and 46 provide substantially frictionless rotation of the shaft 43 and a dynamic seal assembly 48 is provided between the flange 49 on the shaft 43 and the support member 51 within the tube 44.

Immediately below the support member 51 is the liquid passage 53 which receives the liquid from the tank 11 when the impeller 54 on the end of the shaft 43 is being rotated. The conduit 55 leads to the manifold 38 around the flush bowl 17 so that, when the impeller 54 is being rotated, fluid is forced from the tank 11 through the filter 56 and upwardly through the conduit 55 to the manifold 38.

The filter 56 (FIGS. 2–6) itself is supported on the end of the tube 44 and includes an inner rotary assembly 57 and an outer stationary assembly 58. The rotary assembly 57 includes an annular member 60 which rides on the tubular bearing 61 interposed between the member 60 and the lower portion of the tube 44. The bearing 61 and the member 60 are held in position against downward axial movement by another bearing member 63 which is supported on the radial flange 64 of the bracket member 65. This bracket member is secured in place by tightening the screw 66 (FIG. 4) to draw the ends 67 thereof together around the lower end of the tube 44 to fasten securely the bracket member 65 to the tube 44.

The rotary assembly 57 is driven by the elongated shaft 68 (FIG. 2) extending downwardly from the gear reduction unit 42 parallel to the tube 44 and into the stationary housing member 70. A suitable bearing 71 is provided at each end of the shaft 68 for substantially frictionless rotation thereof, and the drive pinion 72 is provided on the lower end of the shaft for engaging the teeth 74 provided on the outside surface of the tubular portion 75 of the annular member 60. The motor 18 drives the gear reduction unit 42 which in turn drives the gear 76 on the upper end of the shaft to rotate the shaft at a speed slower than the impeller 54.

The stationary assembly 58 includes an outer housing member 78 which has a tubular portion 79 around the downwardly extending tube 44 immediately above the member 60. This housing member 78 extends radially outward and has the axially extending side walls 81 thereon which engage the outer peripheral portion 82 of the member 60. Thus downward movement of the housing member 78, as viewed in FIG. 3, is prohibited.

As seen in FIG. 4, three axially extending bars 84 are received in grooves 85 in the side walls 81 of the housing member 78 and secured in place by a pair of machine screws 86 which extend through openings 87 in the bars 84 and the side walls 81 and are threadedly received in the locking member 88. a plurality of annular filtering plates 90 are then stacked between these bars, and each of the plates has three rectangular cutouts in the enlarged outer peripheral portions 93 thereof. The portions 93 of the plates have an enlarged outer dimension such that the innermost edge 94 of the cutout 92 is spaced from the center of the plate 95 at a distance slightly larger than the outer diameter $d_1$ of the portion 96 of the rings intermediate the enlarged portions 93. The increase in outer dimensions between the portions 93 and 96 is gradual so that the sloping edges 97 are provided.

The rotary assembly 57 includes four axial mounting pins 100 which are rigidly secured to the radial flange 101 on the member 60 and which extend coextensively with the bars 84. These pins have a plurality of elongated cleaning blades 102 mounted thereon with the spacer washers 104 interposed between each pair of adjacent blades. The washers 104 have a thickness equal to or slightly larger in thickness of the stationary filter rings 90, and the elongated blades 102 extend between each of these rings to create very small filter spaces 105 between the rings.

The cleaning blades 102 are held against rotary movement in a clockwise direction by the axially extending posts 106 which are parallel to the mounting pins 100 and engage the rear edge 107 of each of the blades 102 in such a manner that the outermost corner 108 of these blades is spaced a distance $d_2$ from the center 95 of the filter. The distance $d_2$ is greater than the distance $d_1$ so that the blades 102 project beyond the portion 96 of the rings 90. The distance $d_2$ is less than the distance $d_3$ to the innermost edge 94 of the cutout 92 so that the outermost corners 108 of the blades 102 are radially outward of the intermediate portion 96 and radially inward of the bars 84. The leading edge 110 of the blades 90 is swept back outwardly and rearwardly in a trailing direction from the inner portion to the outer corner 108 thereof. This angle $a$ of taper between the leading edge 110 of each of the blades 102 and a tangent 111 to the outer diameter of the filter rings 90 is an important feature of the invention and experience has dictated that this angle be less than 45°.

The end cover 115 is secured by the screws 116 which extend through the openings 117 in the cover 115 and into the threaded internal portions 118 of the mounting pins 100. The cover thus locks the blades 102 and filter rings 90 in place and prohibits a downward axial movement thereof, as viewed in FIG. 3. Accordingly, the bottom of the filter 56 is closed, so that any fluid reaching the internal chamber 120 thereof must pass through the spaces 105 between the parallel filter rings 90.

In operation of the filter 56, the motor 18 is energized by a suitable control when it is desired to flush the bowl 17. A timer (not shown) is provided in the electrical circuit with the motor 18 so that the latter operates a prescribed time interval after the switch is closed. As the motor rotates, it causes the impeller 54 to be rotated by the output shaft 43 at a relatively high speed which causes the liquid in the tank 11 to be drawn through the small spaces 105 between the stationary filter rings 90 and into the chamber 120 defined within the filter 56. The liquid then is forced upwardly into the conduit 55 and then to the manifold 38 from where it is discharged along the inside surfaces of the bowl 17 and the spout 35 to rinse the bowl and flush any solid materials into the tank 11.

After the system has been used a number of times, solids begin to build up within the liquid and must be removed before the liquid may be used for proper flushing. Accordingly, as the liquid passes through the small spaces 105 between the filter rings 90, the solids are deposited on the outside edges 90a of the filter rings. Some of these solids may even pass a short distance into the spaces 105.

The rotary assembly 57 moves simultaneously with the rotation of the impeller 54 so that the cleaning blades 102 are moved between the individual rings 90 causing any solid materials between the rings or adjacent the outside edges 90a thereof to be forced outwardly of the rings 90 by the cleaning edges 110. As the cleaning blades 102 pass between the enlarged portions 93 of adjacent rings, the corners 108 are no longer exposed and any solid material which has collected thereon is deposited on the outside surface of the rings 90 in the area of the bars 84.

After the solids have built up the weight thereof causes them to fall to the bottom of the tank. Thus it should be seen that any solid materials which collect on the outside surface of the rings 90, or between the rings, are effectively removed from the filter 56.

When thin paper, plastic diaper material or the like, attempts to pass between the rings 90 they also are likewise forced outwardly by the cleaning edges 110 of the blades 102. In view of the long taper of the cleaning edges these materials cannot be wedged between or around the cleaning blades 102 but rather they are eventually forced radially outward of the filter 56. The outer edges 90a of the filter rings 90 which contact the liquid and solids are stationary, and thus it is substantially impossible for any stringy or other type of material to become wound around the outside of the filter.

While the particular materials used in the construction of the filter may be varied in accordance with the particular use of the filter, in a sewerage system of the type described herein, stainless steel filter rings 90 and cleaning blades 102 are preferable, but other suitable materials are Teflon, Mylar, Delrin (trademarks of the Du Pont Company) as well as numerous other materials may be used without departing from the scope of the invention. The number of filter rings 90 or cleaning blades 102; the angle a of sweep back and the spacing between the rings 90 may also be varied within the scope of the invention, depending upon the particular use and rate of flow to be processed thereby.

While the filter assembly in accordance with this invention is specifically adapted for use with a self-contained sewerage system, it is possible to utilize the filter in other and different applications without departing from the scope of this invention. For example, the filter can be used in various food processing industries wherein juices are being extracted from fruits wherein the size of the spaces 105 is appropriately varied to fit the intended use.

The invention has thus provided an improved filter assembly which is self-cleaning and which has a stationary outer portion which prohibits stringy, thin or other elongated solids from winding around the filter. Moreover, any solids collecting on the outside of the filter rings or between the filter rings are gently forced in a radially outward direction and then deposited in an area of the filter 56 wherein they fall therefrom after they have built up. The liquid adjacent outside of the filter is not subjected to agitation by rotating outer rings or material adhered thereon as in the prior art, and this can be very significant in connection with sewerage systems.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

A filter assembly adapted for use in a self-contained sewerage system having a tank and a flush bowl, comprising a downwardly extending support tube having a liquid passage therein which forms the outlet from the filter assembly, a stationary subassembly secured near the lower end of said tube, said subassembly including a radial flange member having a plurality of downwardly extending bars on the outer periphery thereof, a plurality of annular filter rings held by said bars against rotary movement and defining an internal chamber in communication with said outlet, said rings adapted to be disposed below the liquid level in the tank, each said ring having enlarged outer portions adjacent said bars, a rotary subassembly secured to said lower end of said tube below said radial flange member and internally of said rings, a plurality of downwardly extending posts on said rotary subassembly, a plurality of cleaning blades on each said post, said cleaning blades on each said post extending between each pair of adjacent filter rings for spacing said rings apart a distance equal to the distance between said cleaning blades, spacers on said posts between each of said cleaning blades for regulating the distance between said blades, said blades extending between said rings in sandwiched relation therewith to create small spaces between said rings for the flow of liquid from the tank to said internal chamber and then to said outlet, each said blade being spaced inwardly from said enlarged portion and outwardly of the remainder portion of said rings, a solid bottom member secured to the lower end of said posts to hold said annular rings on said bars against downward movement and to define the bottom of said internal chamber, means for moving said rotary subassembly to move said blades with respect to said rings, and a cleaning edge on the forward portion of each said blade which extends at least at an angle of 45° from a tangent through the point of intersection of said edge and said remainder portion of said rings, said edge extending from the inner portions of said rings toward the outer portions thereof in a direction trailing the direction of rotation of said blades so that any solids between said rings are forced outwardly of said rings and are collected on said enlarged portions wherein they build up and subsequently fall therefrom, substantially square corners on the outermost end of said cleaning edge to cut paper and the like which is held against the outer portions of said annular rings by liquid flowing into said internal chamber, and means for moving liquid into said internal chamber through said spaces between said rings to remove solids material from the liquid.

References Cited

UNITED STATES PATENTS

| | | | |
|---|---|---|---|
| 1,414,120 | 4/1922 | Fulcher | 210—357 |
| 1,852,873 | 4/1931 | Berger | 210—357 X |
| 1,926,557 | 9/1933 | Perkins | 210—357 |
| 1,938,934 | 12/1933 | Scott | 210—357 |
| 3,067,433 | 12/1962 | Dietz et al. | 4—78 |

REUBEN FRIEDMAN, *Primary Examiner.*

J. DE CESARE, *Assistant Examiner.*